(12) United States Patent
Yoshizaki et al.

(10) Patent No.: US 11,914,371 B2
(45) Date of Patent: Feb. 27, 2024

(54) AUTONOMOUS DRIVING VEHICLE THAT AVOIDS NATURAL DISASTERS

(71) Applicant: TOYOTA JIDOSHA KABUSHIKI KAISHA, Aichi-ken (JP)

(72) Inventors: Yasunao Yoshizaki, Okazaki (JP); Koji Taguchi, Sagamihara (JP); Masaki Wasekura, Toyota (JP); Nobuhide Kamata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 17/538,051

(22) Filed: Nov. 30, 2021

(65) Prior Publication Data
US 2022/0083059 A1  Mar. 17, 2022

Related U.S. Application Data

(63) Continuation of application No. 16/120,760, filed on Sep. 4, 2018, now Pat. No. 11,281,215.

(30) Foreign Application Priority Data

Nov. 1, 2017  (JP) .................................. 2017-212099

(51) Int. Cl.
G05D 1/00 (2006.01)
G05D 1/02 (2020.01)
B60W 30/00 (2006.01)

(52) U.S. Cl.
CPC .......... G05D 1/0088 (2013.01); B60W 30/00 (2013.01); G05D 1/0214 (2013.01); G05D 2201/0212 (2013.01)

(58) Field of Classification Search
CPC ............... G05D 1/0088; G05D 1/0214; G05D 2201/0212; B60W 30/00; B60W 30/10; B60W 30/16; B60W 60/0015
See application file for complete search history.

(56) References Cited

U.S. PATENT DOCUMENTS 1,489,598 A * 4/1924 Hinman .................... B60L 3/02
303/56
1,580,722 A * 4/1926 Greathouse ............. E05B 77/46
292/DIG. 3
(Continued)

FOREIGN PATENT DOCUMENTS

CN 105346483 A 2/2016
EP 2527213 A1 * 11/2012 ....... B60R 21/01516
(Continued)

OTHER PUBLICATIONS

English Translation JP2012123835A (Year: 2023).*
(Continued)

*Primary Examiner* — Rami Khatib
(74) *Attorney, Agent, or Firm* — Sughrue Mion, PLLC

(57) ABSTRACT

An autonomous driving vehicle provides a driverless transportation service for a user. An alarming phenomenon is a natural phenomenon that potentially causes a disaster. The autonomous driving vehicle recognizes, based on driving environment information, the alarming phenomenon at a current location of the autonomous driving vehicle or on a planned travel route from the current location to a destination. When recognizing the alarming phenomenon, the autonomous driving vehicle determines whether to continue or halt vehicle travel control in accordance with a current travel plan. When determining to halt the vehicle travel control in accordance with the current travel plan, the autonomous driving vehicle sets an emergency plan depending on a type of the alarming phenomenon and controls the autonomous driving vehicle in accordance with the emergency plan.

7 Claims, 10 Drawing Sheets

| ALARMING PHENOMENON | EMERGENCY PLAN |
|---|---|
| HEAVY RAIN, HEAVY SNOW, FLOOD (ON PLANNED TRAVEL ROUTE) | TRAVEL ALONG BYPASS ROUTE BYPASSING ALARMING PHENOMENON |
| HEAVY RAIN, HEAVY SNOW, FLOOD (AT CURRENT LOCATION) | TRAVEL ALONG EVACUATION ROUTE EVACUATING FROM ALARMING PHENOMENON |
| EARTHQUAKE | STOP VEHICLE AND UNLOCK DOOR |
| TSUNAMI | STOP VEHICLE AND UNLOCK DOOR |

(56) References Cited

U.S. PATENT DOCUMENTS

| | | | | |
|---|---|---|---|---|
| 2,031,344 | A | * | 2/1936 | Thomasma ............ E05B 77/48 |
| | | | | 180/281 |
| 5,867,110 | A | * | 2/1999 | Naito .................... G08G 1/205 |
| | | | | 340/988 |
| 8,000,887 | B2 | | 8/2011 | Nathan et al. |
| 8,423,290 | B1 | | 4/2013 | Walsh |
| 10,086,782 | B1 | | 10/2018 | Konrardy et al. |
| 10,156,848 | B1 | | 12/2018 | Konrardy et al. |
| 2008/0004790 | A1 | * | 1/2008 | Ames .................... G08G 1/205 |
| | | | | 701/532 |
| 2012/0078509 | A1 | | 3/2012 | Choi |
| 2017/0242436 | A1 | * | 8/2017 | Creusot ............ G08G 1/09626 |
| 2017/0261980 | A1 | | 9/2017 | Matsushita et al. |
| 2017/0316533 | A1 | | 11/2017 | Goldman-Shenhar et al. |
| 2018/0096573 | A1 | * | 4/2018 | Tadano ................. G08B 27/00 |
| 2018/0136655 | A1 | | 5/2018 | Kim et al. |
| 2018/0141563 | A1 | * | 5/2018 | Becker ..................... G06T 7/11 |
| 2018/0188726 | A1 | | 7/2018 | Newman |
| 2018/0201187 | A1 | | 7/2018 | Yellambalase et al. |
| 2018/0348759 | A1 | | 12/2018 | Freeman et al. |
| 2019/0019401 | A1 | | 1/2019 | Han et al. |
| 2019/0339701 | A1 | * | 11/2019 | Pedersen ............ G05D 1/0044 |
| 2019/0369623 | A1 | * | 12/2019 | Sadakiyo ............ G05D 1/0214 |

FOREIGN PATENT DOCUMENTS

| | | | |
|---|---|---|---|
| JP | 2006-144595 A | | 6/2006 |
| JP | 2008-146168 A | | 6/2008 |
| JP | 2011-169856 A | | 9/2011 |
| JP | 2012123835 A | * | 6/2012 |
| JP | 2015-191264 A | | 11/2015 |
| JP | 2016122958 A | * | 7/2016 |
| JP | 2017-159827 A | | 9/2017 |

OTHER PUBLICATIONS

Notice of Allowance dated Nov. 26, 2021 from the US Patent & Trademark Office in U.S. Appl. No. 16/120,760.

Xiang Zhiyuan et al., "Car Beauty Decoration", National Defense Industry Press, Aug. 31, 2011, pp. 45-46 (6 pages total).

Office Action issued in U.S. Appl. No. 16/120,760 dated Dec. 30, 2019.

Office Action issued in U.S. Appl. No. 16/120,760 dated Jun. 25, 2020.

Office Action issue in U.S. Appl. No. 16/120,760 dated Apr. 13, 2021.

Office Action dated Mar. 23, 2023 issued in U.S. Appl. No. 17/538,541.

Notice of Allowance dated Oct. 25, 2023 in U.S. Appl. No. 17/538,541.

Corrected Notice of Allowability dated Nov. 14, 2023 in U.S. Appl. No. 17/538,541.

United States Office Action dated Jul. 14, 2023 in U.S. Appl. No. 17/538,541.

* cited by examiner

| ALARMING PHENOMENON | EMERGENCY PLAN |
| --- | --- |
| HEAVY RAIN, HEAVY SNOW, FLOOD (ON PLANNED TRAVEL ROUTE) | TRAVEL ALONG BYPASS ROUTE BYPASSING ALARMING PHENOMENON |
| HEAVY RAIN, HEAVY SNOW, FLOOD (AT CURRENT LOCATION) | TRAVEL ALONG EVACUATION ROUTE EVACUATING FROM ALARMING PHENOMENON |
| EARTHQUAKE | STOP VEHICLE AND UNLOCK DOOR |
| TSUNAMI | STOP VEHICLE AND UNLOCK DOOR |

Fig. 3

AUTONOMOUS DRIVING VEHICLE THAT AVOIDS NATURAL DISASTERS

CROSS-REFERENCE TO RELATED APPLICATION(S)

This application is a continuation application of U.S. patent application Ser. No. 16/120,760, filed Sep. 4, 2018, in the US Patent and Trademark Office, the disclosure of which is incorporated herein in its entirety by reference.

BACKGROUND

Technical Field

The present disclosure relates to an autonomous driving vehicle providing a driverless transportation service.

Background Art

Patent Literature 1 discloses a driverless transportation service using an autonomous driving vehicle that is capable of driving without a human driver. The autonomous driving vehicle heads to a pickup location for picking up a user. On arriving at the pickup location, the autonomous driving vehicle stops and opens a door. The user gets in the autonomous driving vehicle and performs an authentication operation. When the authentication of the user is completed, the autonomous driving vehicle closes the door and locks the door. After that, the autonomous driving vehicle departs and autonomously travels toward a destination desired by the user.

LIST OF RELATED ART

Patent Literature 1: Japanese Laid-Open Patent Publication No. 2015-191264

SUMMARY

Let us consider a case where a natural phenomenon that potentially causes a disaster occurs when an autonomous driving vehicle with a user on board is heading to a destination. How to deal with that case is not described at all in the above-described Patent Literature 1. Therefore, the autonomous driving vehicle continues the autonomous travel toward the destination without making any response, even when the natural phenomenon causing a disaster occurs. This is not preferable from a viewpoint of security of the user on board the autonomous driving vehicle.

An object of the present disclosure is to provide a technique that can improve safety of a user of a driverless transportation service when a natural phenomenon that potentially causes a disaster occurs.

A first disclosure provides an autonomous driving vehicle that provides a driverless transportation service for a user.
The autonomous driving vehicle includes:
an information acquisition device that acquires driving environment information indicating driving environment for the autonomous driving vehicle; and
a vehicle travel control device that controls travel of the autonomous driving vehicle based on the driving environment information.
An alarming phenomenon is a natural phenomenon that potentially causes a disaster.
The vehicle travel control device performs:
alarming phenomenon recognition processing that recognizes, based on the driving environment information, the alarming phenomenon at a current location of the autonomous driving vehicle or on a planned travel route from the current location to a destination;
determination processing that determines, when recognizing the alarming phenomenon, whether to continue or halt vehicle travel control in accordance with a current travel plan; and
emergency control processing that sets, when determining to halt the vehicle travel control in accordance with the current travel plan, an emergency plan depending on a type of the alarming phenomenon and controls the autonomous driving vehicle in accordance with the emergency plan.

A second disclosure further has the following feature in addition to the first disclosure.
The information acquisition device includes:
a sensor that detects a state of the autonomous driving vehicle and a situation around the autonomous driving vehicle; and
a communication device that communicates with a management server that delivers delivery information indicating, for each area, information relating to occurrence of the alarming phenomenon.
The driving environment information includes:
sensor detected information obtained from a detection result by the sensor; and
the delivery information received from the management server through the communication device.
In the alarming phenomenon recognition processing, the vehicle travel control device recognizes the alarming phenomenon based on at least one of the sensor detected information and the delivery information.

A third disclosure further has the following feature in addition to the second disclosure.
The alarming phenomenon is a first alarming phenomenon being heavy rain, heavy snow, or flood on the planned travel route.
In the alarming phenomenon recognition processing, the vehicle travel control device recognizes the first alarming phenomenon based on the delivery information.
In the determination processing, when an alert level of the first alarming phenomenon is a certain level or higher, the vehicle travel control device determines to halt the vehicle travel control in accordance with the current travel plan.
In the emergency control processing, the vehicle travel control device determines, based on the driving environment information, a bypass route that bypasses the first alarming phenomenon to reach the destination.
The emergency plan includes making the autonomous driving vehicle travel along the bypass route.

A fourth disclosure further has the following feature in addition to the second disclosure.
The alarming phenomenon is a second alarming phenomenon being heavy rain, heavy snow, or flood at the current location.
In the alarming phenomenon recognition processing, the vehicle travel control device recognizes the second alarming phenomenon based on at least one of the sensor detected information and the delivery information.
In the determination processing, when an alert level of the second alarming phenomenon is a certain level or higher, the vehicle travel control device determines to halt the vehicle travel control in accordance with the current travel plan.

In the emergency control processing, the vehicle travel control device determines, based on the driving environment information, an evacuation route that enables evacuation from the second alarming phenomenon.

The emergency plan includes making the autonomous driving vehicle travel along the evacuation route.

A fifth disclosure further has the following feature in addition to the fourth disclosure.

The emergency plan includes making the autonomous driving vehicle stop at around the current location and unlocking a door after the autonomous driving vehicle stops, if the autonomous driving vehicle is unable to evacuate from the second alarming phenomenon.

A sixth disclosure further has the following feature in addition to the second disclosure.

The alarming phenomenon is earthquake.

In the alarming phenomenon recognition processing, the vehicle travel control device recognizes the earthquake based on the delivery information.

In the determination processing, when a seismic intensity of the earthquake at the current location is a certain level or higher, the vehicle travel control device determines to halt the vehicle travel control in accordance with the current travel plan.

The emergency plan includes making the autonomous driving vehicle stop at around the current location and unlocking a door after the autonomous driving vehicle stops, regardless of the destination.

A seventh disclosure further has the following feature in addition to the second disclosure.

The alarming phenomenon is tsunami.

In the alarming phenomenon recognition processing, the vehicle travel control device recognizes the tsunami based on the delivery information.

In the determination processing, when an expected area of the tsunami covers the current location or the planned travel route, the vehicle travel control device determines to halt the vehicle travel control in accordance with the current travel plan.

The emergency plan includes making the autonomous driving vehicle stop at around the current location and unlocking a door after the autonomous driving vehicle stops, regardless of the destination.

An eighth disclosure further has the following feature in addition to any one of the first to seventh disclosures.

In the emergency control processing, the vehicle travel control device proposes the emergency plan to the user and controls the autonomous driving vehicle in accordance with the emergency plan when the emergency plan is approved by the user.

According to the present disclosure, when the alarming phenomenon occurs at the current location or on the planned travel route, the autonomous driving vehicle determines whether to continue or halt the vehicle travel control in accordance with the current travel plan. When determining to halt the vehicle travel control in accordance with the current travel plan, the autonomous driving vehicle performs the vehicle travel control in accordance with the emergency plan. The emergency plan is appropriately set depending on the type of the alarming phenomenon. As a result, the safety of the user on board the autonomous driving vehicle improves. This contributes to increase in confidence in the driverless transportation service.

BRIEF DESCRIPTION OF DRAWINGS

FIG. 3 is a diagram showing various examples of an emergency plan depending on a type of an alarming phenomenon in the embodiment of the present disclosure;

EMBODIMENTS

Embodiments of the present disclosure will be described below with reference to the attached drawings.

1. Outline 1-1. Driverless Transportation System

Figure 1:
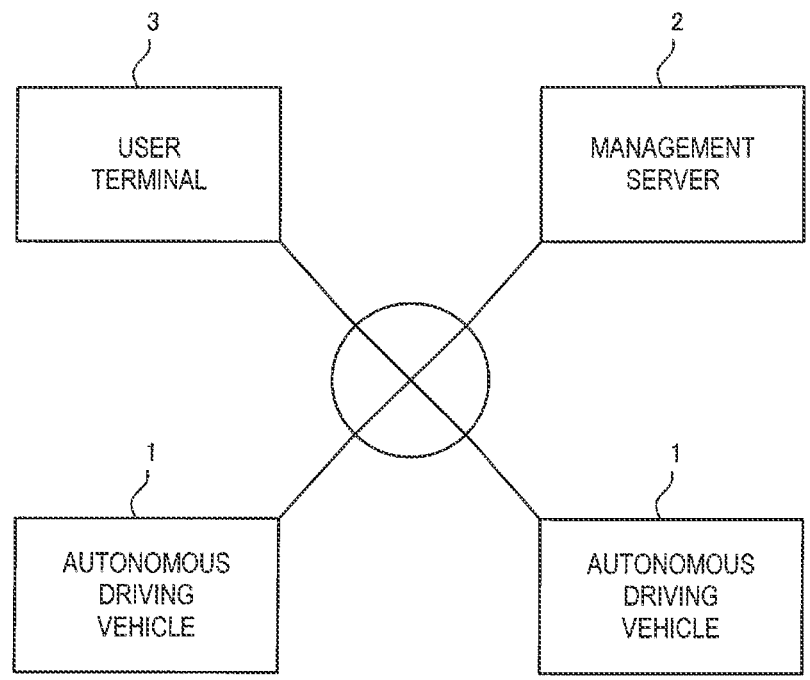
FIG. 1 is a block diagram schematically showing a configuration of a driverless transportation system according to an embodiment of the present disclosure.

FIG. 1 is a block diagram schematically showing a configuration of a driverless transportation system according to the present embodiment. The driverless transportation system provides a driverless transportation service for a user. The driverless transportation system includes an autonomous driving vehicle 1, a management server 2, and a user terminal 3.

The autonomous driving vehicle 1 is capable of autonomous driving without a human driver. The user rides the autonomous driving vehicle 1 and the autonomous driving vehicle 1 provides the driverless transportation service for the user. The autonomous driving vehicle 1 is capable of communicating with the management server 2 and the user terminal 3 through a communication network.

The management server 2 is a server that manages the driverless transportation service. For example, the management server 2 manages registration information of the user and an operating state of the autonomous driving vehicle 1. Moreover, the management server 2 is capable of communicating with the autonomous driving vehicle 1 and the user terminal 3 through the communication network.

The user terminal 3 is a terminal carried by the user. The user terminal 3 is capable of communicating with the autonomous driving vehicle 1 and the management server 2 through the communication network. Such the user terminal 3 is exemplified by a smartphone.

A basic flow of the driverless transportation service is as follows.

First, the user uses the user terminal 3 to send a dispatch request. The dispatch request includes a pickup location desired by the user, and so forth. The dispatch request is transmitted to the management server 2 through the communication network. The management server 2 selects an autonomous driving vehicle 1 that provides the service for the user, and transmits information of the dispatch request to the selected autonomous driving vehicle 1. The autonomous driving vehicle 1 receiving the information automatically heads to the pickup location.

The autonomous driving vehicle 1 arrives at the pickup location and stops. The user takes a ride in the autonomous driving vehicle 1. The user notifies the autonomous driving vehicle 1 of a desired destination (drop-off location). Alternatively, the information of the destination may be included in the dispatch request. The autonomous driving vehicle 1 locks a door and then autonomously travels toward the destination. The autonomous driving vehicle 1 arrives at the destination and stops. The autonomous driving vehicle 1 unlocks the door and the user gets off the autonomous driving vehicle 1.

1-2. Response to Alarming Phenomenon

Figure 2:
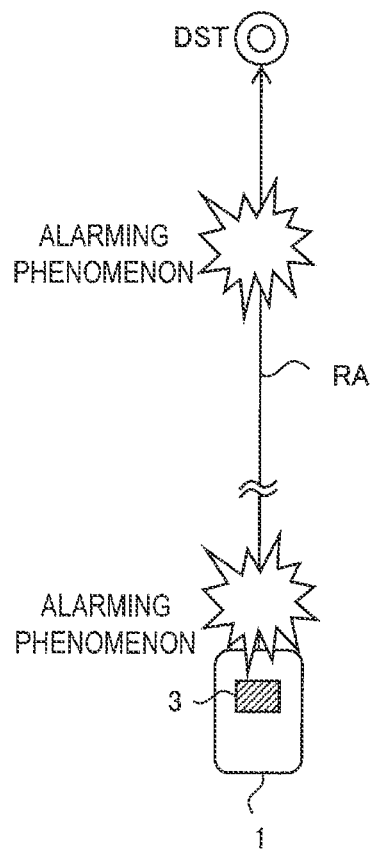
FIG. 2 is a conceptual diagram for explaining a feature of an autonomous driving vehicle according to the embodiment of the present disclosure.

FIG. 2 shows the autonomous driving vehicle 1 that is traveling toward a destination DST with the user on board. The autonomous driving vehicle 1 creates a travel plan for reaching the destination DST and performs vehicle travel control in accordance with the travel plan. The travel plan includes a travel route from a current location to the destination DST. The travel route is hereinafter referred to as a "planned travel route RA".

Here, let us consider a case where a natural phenomenon that potentially causes a disaster occurs. The natural phenomenon that potentially causes a disaster is hereinafter referred to as an "alarming phenomenon". The alarming phenomenon is exemplified by heavy rain, heavy snow, flood, earthquake, tsunami, and so forth. When the alarming phenomenon occurs at the current location or on the planned travel route RA, it is not necessarily preferable to continue the vehicle travel control in accordance with a current travel plan. From a viewpoint of security of the user on board the autonomous driving vehicle 1, it is preferable to make an appropriate response depending on a type of the alarming phenomenon.

In view of the above, the autonomous driving vehicle 1 according to the present embodiment recognizes the alarming phenomenon at the current location or on the planned travel route RA. When recognizing the alarming phenomenon, the autonomous driving vehicle 1 determines, from a viewpoint of a danger level of the alarming phenomenon, whether to continue or halt the vehicle travel control in accordance with the current travel plan. When determining to halt the vehicle travel control in accordance with the current travel plan, the autonomous driving vehicle 1 performs the vehicle travel control in accordance with a substitute plan. The substitute plan is hereinafter referred to as an "emergency plan".

The autonomous driving vehicle 1 according to the present embodiment sets an appropriate emergency plan depending on the type of the alarming phenomenon. FIG. 3 shows various examples of the emergency plan depending on the type of the alarming phenomenon.

Figure 4:
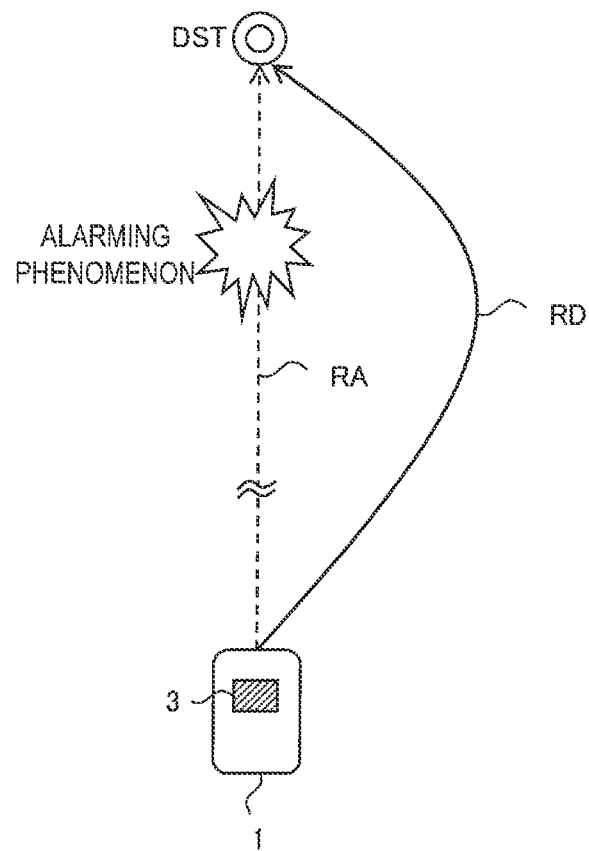
FIG. 4 is a conceptual diagram for explaining an example of the emergency plan in the embodiment of the present disclosure.

As an example, let us consider a case where the alarming phenomenon is heavy rain, heavy snow, or flood on the planned travel route RA. Such the alarming phenomenon is hereinafter referred to as a "first alarming phenomenon", for the sake of convenience. When continuing the vehicle travel control in accordance with the current travel plan, the autonomous driving vehicle 1 encounters the first alarming phenomenon on the planned travel route RA. Therefore, the autonomous driving vehicle 1 searches for a "bypass route RD" as shown in FIG. 4. The bypass route RD is a travel route that starts from the current location and bypasses the first alarming phenomenon to reach the destination DST. Then, the autonomous driving vehicle 1 travels along the bypass route RD instead of the planned travel route RA. That is to say, when the alarming phenomenon is the first alarming phenomenon, the emergency plan is to make the autonomous driving vehicle 1 travel along the bypass route RD.

Figure 5:
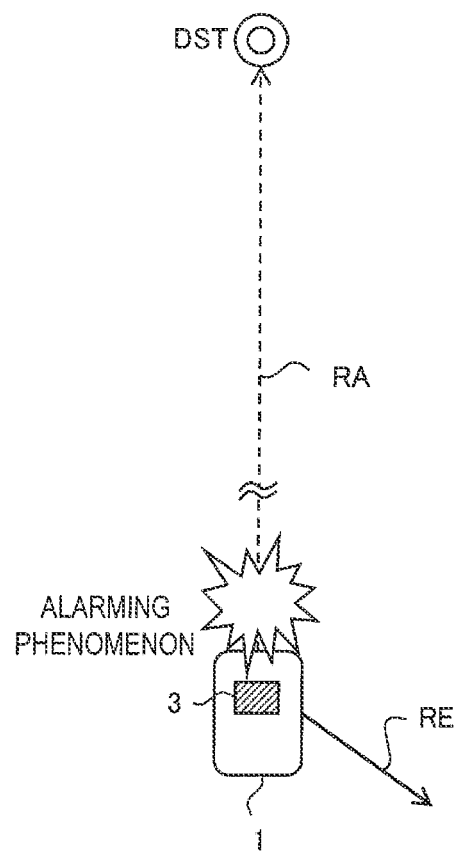
FIG. 5 is a conceptual diagram for explaining another example of the emergency plan in the embodiment of the present disclosure.

As another example, let us consider a case where the alarming phenomenon is heavy rain, heavy snow, or flood at the current location. Such the alarming phenomenon is hereinafter referred to as a "second alarming phenomenon", for the sake of convenience. In the case of the second alarming phenomenon, it is preferable to evacuate from the second alarming phenomenon as early as possible. Therefore, the autonomous driving vehicle 1 searches for an "evacuation route RE" that enables evacuation from the second alarming phenomenon. As shown in FIG. 5, the autonomous driving vehicle 1 travels along the evacuation route RE, regardless of the planned travel route RA. That is to say, when the alarming phenomenon is the second alarming phenomenon, the emergency plan is to make the autonomous driving vehicle 1 travel along the evacuation route RE.

As still another example, let us consider a case where the alarming phenomenon is earthquake. When a seismic intensity of the earthquake at the current location is a certain level or higher, the autonomous driving vehicle 1 stops and unlocks a door, even if it has not yet arrived at the destination DST (see FIG. 6). That is to say, when the alarming phenomenon is earthquake, the emergency plan is to make the autonomous driving vehicle 1 stop and unlock the door, regardless of the destination DST. As a result, the user can take an appropriate action depending on a situation.

As still another example, let us consider a case where the alarming phenomenon is tsunami. When an area of the tsunami is expected to cover the current location or the planned travel route RA, the autonomous driving vehicle 1 stops and unlocks a door, even if it has not yet arrived at the destination DST (see FIG. 6). That is to say, when the alarming phenomenon is tsunami, the emergency plan is to make the autonomous driving vehicle 1 stop and unlock the door, regardless of the destination DST. As a result, the user can take an appropriate action depending on a situation.

According to the present embodiment, as described above, when the alarming phenomenon occurs at the current location or on the planned travel route RA, the autonomous driving vehicle 1 determines whether to continue or halt the vehicle travel control in accordance with the current travel plan. When determining to halt the vehicle travel control in accordance with the current travel plan, the autonomous driving vehicle 1 aborts the current travel plan and performs the vehicle travel control in accordance with the emergency plan. The emergency plan is appropriately set depending on the type of the alarming phenomenon. As a result, the safety of the user on board the autonomous driving vehicle 1 improves. This contributes to increase in confidence in the driverless transportation service.

Hereinafter, the autonomous driving vehicle 1 according to the present embodiment will be described in detail.

2. Configuration Example of Autonomous Driving Vehicle

Figure 7:
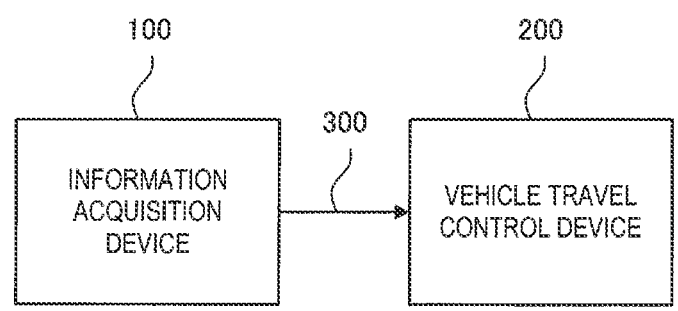
FIG. 7 is a block diagram schematically showing a configuration of the autonomous driving vehicle according to the embodiment of the present disclosure.

FIG. 7 is a block diagram schematically showing a configuration of the autonomous driving vehicle 1 according to the present embodiment. The autonomous driving vehicle 1 is provided with an information acquisition device 100 and a vehicle travel control device 200. Information indicating driving environment for the autonomous driving vehicle 1 is required for autonomous driving control of the autonomous driving vehicle 1. Such the information indicating the driving environment of the autonomous driving vehicle 1 is hereinafter referred to as "driving environment information 300". The information acquisition device 100 acquires the driving environment information 300. The vehicle travel control device 200 controls travel of the autonomous driving vehicle 1 based on the driving environment information 300.

Figure 8:
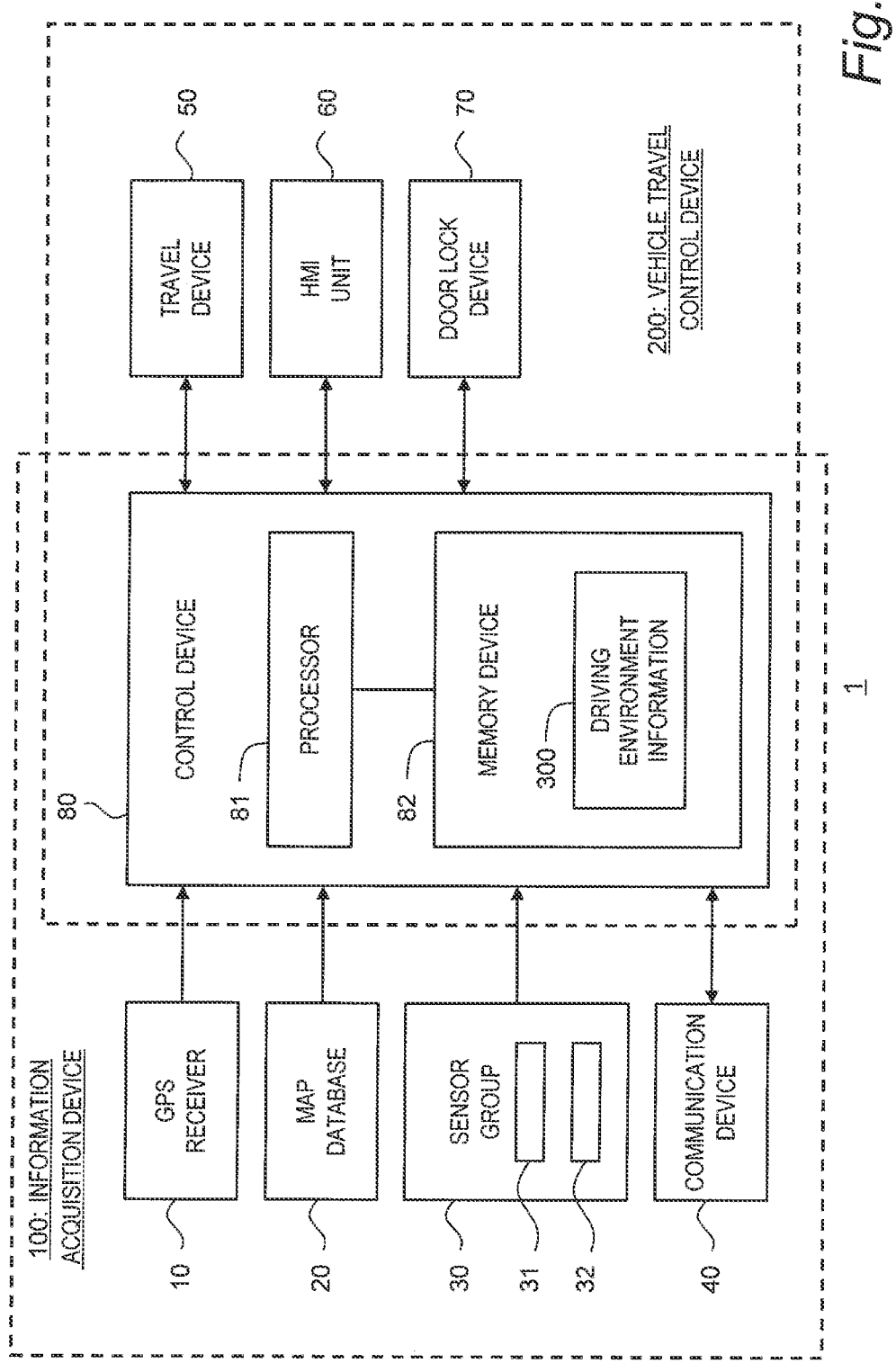
FIG. 8 is a block diagram showing a configuration example of the autonomous driving vehicle according to the embodiment of the present disclosure.

FIG. 8 is a block diagram showing a configuration example of the autonomous driving vehicle 1 according to the present embodiment. The autonomous driving vehicle 1 is provided with a GPS (Global Positioning System) receiver 10, a map database 20, a sensor group 30, a communication device 40, a travel device 50, an HMI (Human Machine Interface) unit 60, a door lock device 70, and a control device 80.

The GPS receiver 10 receives signals transmitted from a plurality of GPS satellites and calculates a position and an orientation of the autonomous driving vehicle 1 based on the received signals.

Map information is recorded in the map database 20. The map information includes lane information indicating a lane geometry. In addition, the map information may further include terrain information, river information, height information, and so forth.

The sensor group 30 detects a state of the autonomous driving vehicle 1 and a situation around the autonomous driving vehicle 1. More specifically, the sensor group 30 includes a vehicle state sensor 31 and a surrounding situation sensor 32.

The vehicle state sensor 31 detects a variety of states of the autonomous driving vehicle 1. For example, the vehicle state sensor 31 includes a vehicle speed sensor that detects a speed of the autonomous driving vehicle 1 (i.e. a vehicle speed). The vehicle state sensor 31 may further include a sensor that detects an operating state of a wiper.

The surrounding situation sensor 32 detects a situation (environment) around the autonomous driving vehicle 1. For example, the surrounding situation sensor 32 includes a camera that images the situation around the autonomous driving vehicle 1. The surrounding situation sensor 32 may further include a LIDAR (Laser Imaging Detection and Ranging) and a radar. The LIDAR uses laser lights to detect a target around the autonomous driving vehicle 1. The radar uses radio waves to detect a target around the autonomous driving vehicle 1.

The communication device 40 communicates with the outside of the autonomous driving vehicle 1. More specifically, the communication device 40 communicates with the management server 2 and the user terminal 3 through the communication network. The communication device 40 may further have a function of performing V2X communication (i.e. a vehicle-to-vehicle communication and a vehicle-to-infrastructure communication) with surrounding vehicles and a roadside infrastructure.

The travel device 50 includes a steering device, a driving device, and a braking device. The steering device turns wheels. The driving device is a power source that generates a driving force. The driving device is exemplified by an engine and an electric motor. The braking device generates a braking force.

The HMI unit 60 is an interface for proving the user with information and receiving information from the user. More specifically, the HMI unit 60 includes an input device and an output device. The input device is exemplified by a touch panel, a switch, a microphone, and the like. The output device is exemplified by a display device, a speaker, and the like.

The door lock device 70 locks/unlocks the door of the autonomous driving vehicle 1.

The control device 80 controls the autonomous driving of the autonomous driving vehicle 1. The control device 80 is a microcomputer including a processor 81 and a memory device 82. The control device 80 is also called an ECU (Electronic Control Unit). The autonomous driving control by the control device 80 is achieved by the processor 81 executing a control program stored in the memory device 82.

The information acquisition device 100 mentioned above includes the GPS receiver 10, the map database 20, the sensor group 30, the communication device 40, and the control device 80. The control device 80 acquires the driving environment information 300 through the GPS receiver 10, the map database 20, the sensor group 30, and the communication device 40. The driving environment information 300 is stored in the memory device 82 and appropriately read out to be used.

Figure 9:
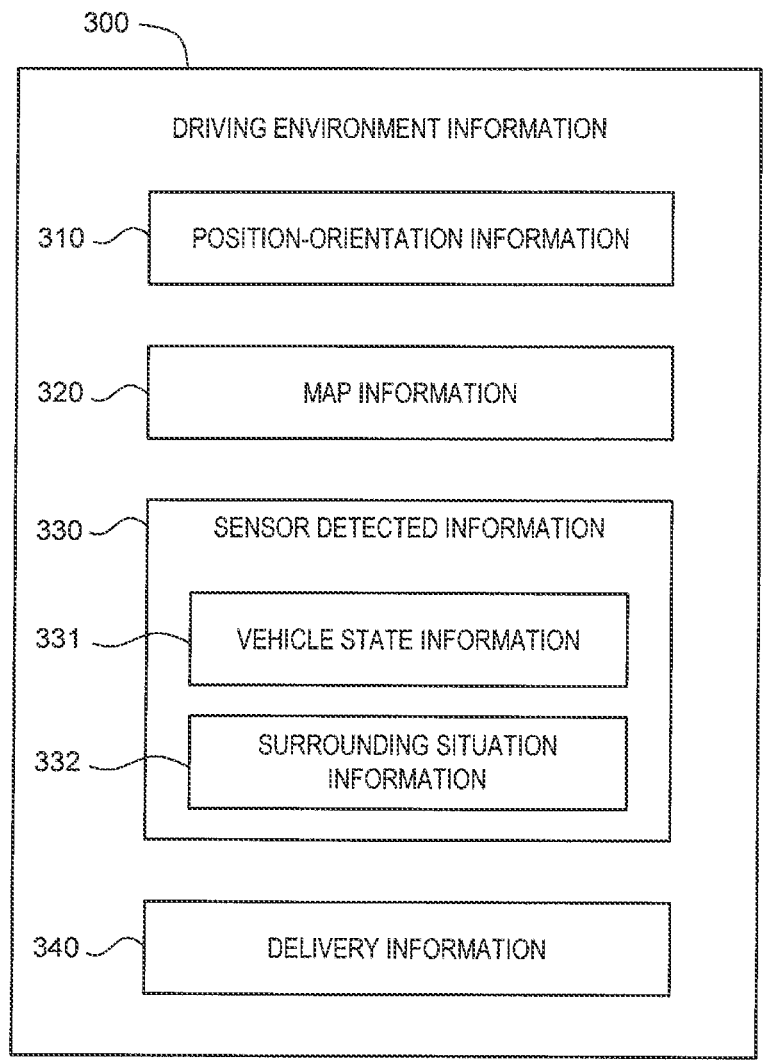
FIG. 9 is a block diagram showing an example of driving environment information used in the autonomous driving vehicle according to the embodiment of the present disclosure.

FIG. 9 is a block diagram showing an example of the driving environment information 300 in the present embodiment. The driving environment information 300 includes position-orientation information 310, map information 320, sensor detected information 330, and delivery information 340.

The position-orientation information 310 indicates the position and the orientation of the autonomous driving vehicle 1. The control device 80 acquires the position-orientation information 310 from the GPS receiver 10.

The map information 320 includes lane information indicating the lane geometry. In addition, the map information 320 may further include the terrain information, the river information, the height information, and so forth. Based on the position-orientation information 310 and the map database 20, the control device 80 acquires the map information 320 around the current location of the autonomous driving vehicle 1 and the map information 320 of necessary areas.

The sensor detected information 330 is information obtained from the detection result by the sensor group 30. More specifically, the sensor detected information 330 includes vehicle state information 331 and surrounding situation information 332.

The vehicle state information 331 indicates the state of the autonomous driving vehicle 1. For example, the vehicle state information 331 includes the speed of the autonomous driving vehicle 1 (i.e. the vehicle speed). The vehicle state information 331 may further include the operating state of the wiper of the autonomous driving vehicle 1. The control device 80 acquires the vehicle state information 331 based on the detection result by the vehicle state sensor 31.

The surrounding situation information 332 indicates the situation around the autonomous driving vehicle 1. For example, the surrounding situation information 332 includes image information imaged by the camera. Moreover, the surrounding situation information 332 includes target information regarding a target around the autonomous driving vehicle 1. The surrounding target is exemplified by a surrounding vehicle, a pedestrian, a roadside structure, a white line, and so forth. The control device 80 acquires the surrounding situation information 332 based on the detection result by the surrounding situation sensor 32.

The delivery information 340 is information delivered (distributed) by the management server 2. The control device 80 receives the delivery information 340 from the management server 2 through the communication device 40. For example, the delivery information 340 includes road traffic information (e.g. roadwork section information, accident information, traffic regulation information, traffic jam information). Furthermore, the delivery information 340 includes "alarming phenomenon information" that indicates, for each area, information relating to occurrence of the alarming phenomenon.

For example, the alarming phenomenon information relating to heavy rain and heavy snow indicates, for each area, an advisory, a warning, a rainfall amount, a snow accumulation, and so forth. Each of the rainfall amount and the snow accumulation may include not only an actual measurement value but also a forecast value.

As another example, the alarming phenomenon information relating to flood indicates, for each area, an advisory, a warning, a flood water level, a river water level, and so forth. Each of the flood water level and the river water level may include only an actual measurement value but also a forecast value.

As still another example, the alarming phenomenon information relating to earthquake indicates a seismic intensity for each area.

As still another example, the alarming phenomenon information relating to tsunami indicates an advisory, a warning, and an expected area of the tsunami.

When the management server 2 knows the current location, the destination DST, and the planned travel route RA of each autonomous driving vehicle 1 under management, the management server 2 may recognize the alarming phenomenon at the current location or on the planned travel route RA of each autonomous driving vehicle 1. In that case, the management server 2 sends information indicating the recognition result to the autonomous driving vehicle 1. Such the information also is included in the alarming phenomenon information according to the present embodiment.

It should be noted that the alarming phenomenon information (the delivery information 340) may be sent not only to the autonomous driving vehicle 1 but also to the user terminal 3. In this case, the user can directly refer to the information relating to the occurrence of the alarming phenomenon and thus make the user's own judgment about how to act.

Referring to FIG. 8 again, the vehicle travel control device 200 mentioned above includes the travel device 50, the HMI unit 60, the door lock device 70, and the control device 80. The control device 80 controls the travel of the autonomous driving vehicle 1 based on the driving environment information 300.

More specifically, the control device 80 creates a travel plan of the autonomous driving vehicle 1 based on the driving environment information 300. The travel plan includes the travel route from the current location to the destination DST, that is, the planned travel route RA. The planned travel route RA is determined from the destination DST, the position-orientation information 310, and the map information 320. The control device 80 controls the travel device 50 to make the autonomous driving vehicle 1 travel in accordance with the travel plan.

Furthermore, the control device 80 recognizes, based on the driving environment information 300, the alarming phenomenon at the current location or on the planned travel route RA. When recognizing the alarming phenomenon, the control device 80 determines whether to continue or halt the vehicle travel control in accordance with the current travel plan. When determining to halt the vehicle travel control in accordance with the current travel plan, the control device 80 sets an appropriate emergency plan depending on the type of the alarming phenomenon (see FIG. 3). The policy for setting the emergency plan is predetermined and stored, as setting policy information, in the memory device 82.

The control device 80 controls the autonomous driving vehicle 1 in accordance with the emergency plan. For example, the control device 80 controls the travel device 50 to stop the autonomous driving vehicle 1. As another example, the control device 80 controls the door lock device 70 to unlock the door of the autonomous driving vehicle 1. Moreover, the control device 80 can propose the emergency plan to the user and receive a user's response (approval or refusal) through the HMI unit 60.

Hereinafter, processing by the autonomous driving vehicle 1 according to the present embodiment will be described in more detail.

3. Processing Flow by Autonomous Driving Vehicle

Figure 10:
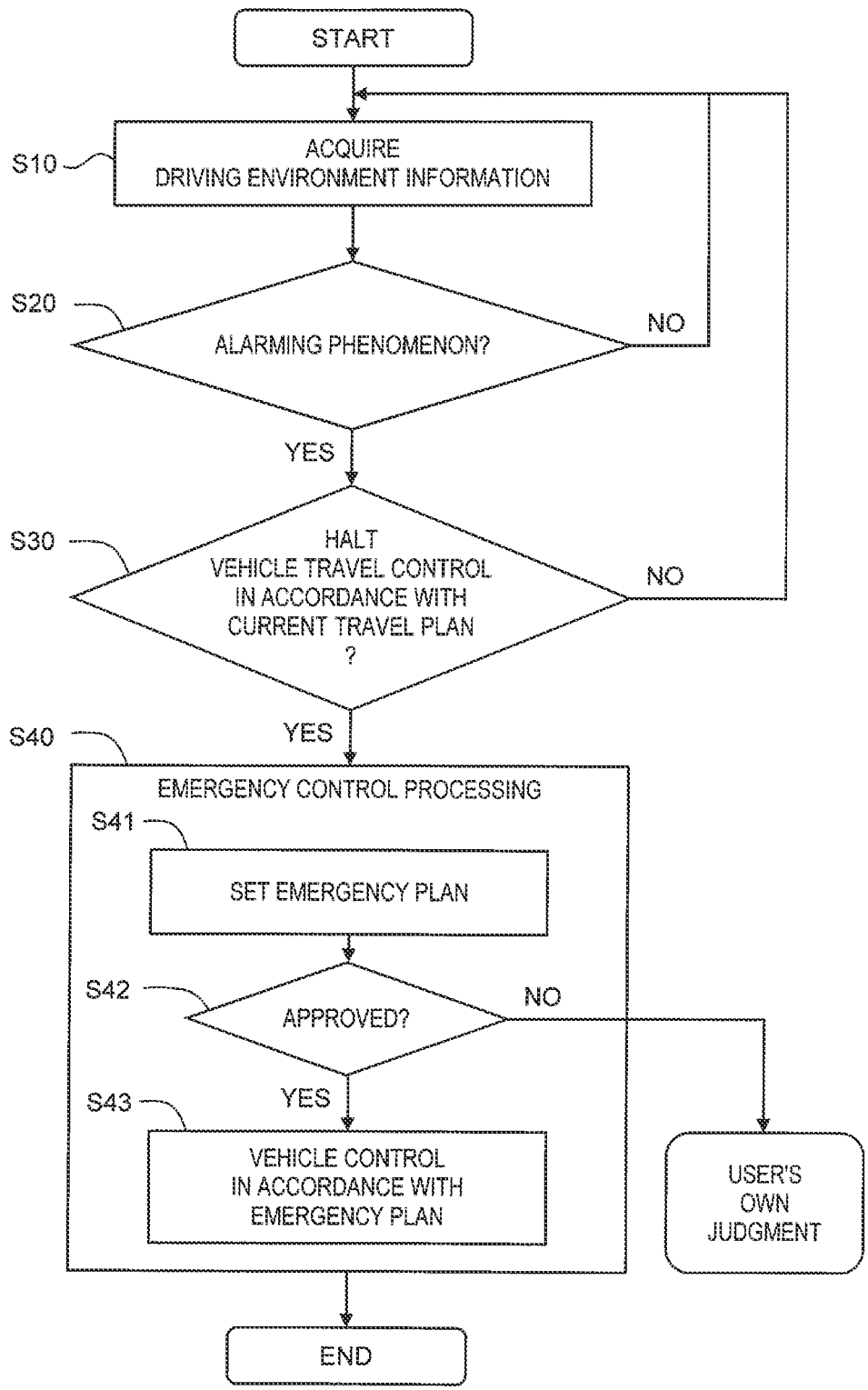
FIG. 10 is a flow chart showing processing by the autonomous driving vehicle according to the embodiment of the present disclosure.

FIG. 10 is a flow chart showing processing by the autonomous driving vehicle 1 according to the present embodiment.

Step S10:

The information acquisition device 100 acquires the driving environment information 300. After that, the processing proceeds to the next Step S20.

Step S20:

The vehicle travel control device 200 performs "alarming phenomenon recognition processing" that recognizes the alarming phenomenon based on the driving environment information 300. More specifically, the vehicle travel control device 200 analyzes the driving environment information 300 to determine whether or not the alarming phenomenon is occurring at the current location or on the planned travel route RA. In the alarming phenomenon recognition processing, the vehicle travel control device 200 recognizes the alarming phenomenon based on at least one of the sensor detected information 330 and the delivery information 340 described above. Concrete examples of the alarming phenomenon recognition processing will be described later.

When the vehicle travel control device 200 recognizes the alarming phenomenon (Step S20; Yes), the processing proceeds to Step S30. On the other hand, when the vehicle travel control device 200 does not recognize the alarming phenomenon (Step S20; No), the processing returns back to Step S10.

Step S30:

The vehicle travel control device 200 performs "determination processing" that determines whether to continue or halt the vehicle travel control in accordance with the current travel plan. Concrete examples of the determination processing will be described later. When the vehicle travel control device 200 determines to halt the vehicle travel control in accordance with the current travel plan (Step S30; Yes), the processing proceeds to Step S40. Otherwise (Step S30; No), the processing returns back to Step S10.

Step S40:

The vehicle travel control device 200 performs "emergency control processing". More specifically, the vehicle travel control device 200 sets the emergency plan as a substitute for the current travel plan (Step S41). Here, the vehicle travel control device 200 sets the appropriate emergency plan depending on the type of the alarming phenomenon (see FIG. 3). The policy for setting the emergency plan is predetermined and stored, as setting policy information, in the memory device 82.

The vehicle travel control device 200 may propose the emergency plan to the user by using the output device of the HMI unit 60 (Step S42). The user uses the input device of the HMI unit 60 to approve or refuse the proposed emergency plan. When the user approves the emergency plan (Step S42; Yes), the vehicle travel control device 200 controls the autonomous driving vehicle 1 in accordance with the emergency plan (Step S43). On the other hand, when the user refuses the emergency plan (Step S42; No), how to act is left to the user's own judgment.

It should be noted that in a case of high urgency, the vehicle travel control device 200 may immediately execute the emergency plan without inquiring of the user.

4. Concrete Examples of Processing

4-1. First Example

As a first example, let us consider a case where the alarming phenomenon is heavy rain, heavy snow, or flood on the planned travel route RA. Heavy rain, heavy snow, or flood on the planned travel route RA is hereinafter referred to as a "first alarming phenomenon", for the sake of convenience.

Step S20: Alarming Phenomenon Recognition Processing

The vehicle travel control device 200 can recognize the first alarming phenomenon based on the delivery information 340 (specifically, the alarming phenomenon information). The delivery information 340 indicates, for each area, an advisory, a warning, a rainfall amount, a snow accumulation, a flood water level, a river water level, and so forth. When the advisory or the warning is issued for an area through which the planned travel route RA passes, the vehicle travel control device 200 recognizes the first alarming phenomenon. When the rainfall amount, the snow accumulation, the flood water level, or the river water level in an area through which the planned travel route RA passes exceeds a recognition threshold, the vehicle travel control device 200 recognizes the first alarming phenomenon.

When the management server 2 knows the current location, the destination DST, and the planned travel route RA of each autonomous driving vehicle 1 under management, the management server 2 may recognize the first alarming phenomenon. In this case, the management server 2 sends information indicating the recognition result, as the alarming phenomenon information, to the autonomous driving vehicle 1. The vehicle travel control device 200 recognizes the first alarming phenomenon based on the information received from the management server 2.

Step S30: Determination Processing

The vehicle travel control device 200 determines whether to continue or halt the vehicle travel control in accordance with the current travel plan. More specifically, the vehicle travel control device 200 refers to the delivery information 340 (specifically, the alarming phenomenon information) to determine whether or not an alert level (urgency) of the first alarming phenomenon is a certain level or higher. When the alert level is the certain level or higher, the vehicle travel control device 200 determines to halt the vehicle travel control in accordance with the current travel plan.

For example, when not the advisory but the warning is issued, the vehicle travel control device 200 determines that the alert level is the certain level or higher. As another example, when the rainfall amount, the snow accumulation, the flood water level, or the river water level is equal to or greater than a determination threshold, the vehicle travel control device 200 determines that the alert level is the certain level or higher. It should be noted that the determination threshold is set to be higher than the recognition threshold used in the above-described Step S20.

Step S40: Emergency Control Processing

As shown in FIG. 4, the vehicle travel control device 200 determines the bypass route RD that starts from the current location and bypasses the first alarming phenomenon to reach the destination DST. The bypass route RD can be determined from the position-orientation information 310, the map information 320, the destination DST, and the delivery information 340. For example, the bypass route RD is so determined as not to pass an area within a radius of X [km] from an occurrence area or an expected occurrence area of the first alarming phenomenon.

The emergency plan is to make the autonomous driving vehicle 1 travel along the bypass route RD. The vehicle travel control device 200 proposes the emergency plan to the user. When the user approves the emergency plan, the vehicle travel control device 200 aborts the planned travel route RA and makes the autonomous driving vehicle 1 travel along the bypass route RD.

4-2. Second Example

As a second example, let us consider a case where the alarming phenomenon is heavy rain, heavy snow, or flood at the current location. Heavy rain, heavy snow, or flood at the current location is hereinafter referred to as a "second alarming phenomenon", for the sake of convenience.

Step S20: Alarming Phenomenon Recognition Processing

The vehicle travel control device 200 can recognize the second alarming phenomenon based on at least one of the delivery information 340 (the alarming phenomenon information) and the sensor detected information 330. The case where the delivery information 340 is used is the same as in the first example described above. The case where the sensor detected information 330 is used is as follows.

For example, the vehicle travel control device 200 recognizes the white line on the road based on the image information (i.e. the surrounding situation information 332) acquired by the camera. When accuracy of the white line recognition decreases, there is a high possibility that heavy rain, heavy snow, or flood is occurring at the current location. Therefore, the vehicle travel control device 200 can recognize the second alarming phenomenon based on the decrease in the accuracy of the white line recognition. When generalized, the vehicle travel control device 200 can recognize the second alarming phenomenon when reliability of image processing of the image information decreases.

As another example, when heavy rain or heavy snow is occurring at the current location, the wiper is expected to move at a high-speed for more than a certain period of time. Therefore, the vehicle travel control device 200 may consider the operating state of the wiper in addition to the reliability of the image processing of the image information. The operating state of the wiper is included in the vehicle state information 331. By considering the operating state of the wiper, the accuracy of the recognition of the second alarming phenomenon is increased.

Moreover, it is possible to further increase the accuracy of the recognition of the second alarming phenomenon by using both the sensor detected information 330 and the delivery information 340.

Step S30: Determination Processing

The vehicle travel control device 200 determines whether to continue or halt the vehicle travel control in accordance with the current travel plan. More specifically, the vehicle travel control device 200 refers to at least one of the sensor detected information 330 and the delivery information 340 to determine whether or not an alert level (urgency) of the second alarming phenomenon is a certain level or higher. The case where the delivery information 340 is used is the same as in the first example described above. The case where the sensor detected information 330 is used is as follows.

As in the case of the above-described Step S20, the vehicle travel control device 200 considers the reliability of the image processing of the image information. When the reliability becomes lower than a determination threshold (e.g. 70%), the vehicle travel control device 200 determines that the alert level is the certain level or higher. When the alert level is the certain level or higher, the vehicle travel control device 200 determines to halt the vehicle travel control in accordance with the current travel plan.

Step S40: Emergency Control Processing

As shown in FIG. 5, the vehicle travel control device 200 determines the evacuation route RE that enables evacuation from the second alarming phenomenon. The evacuation route RE can be determined from the position-orientation information 310, the map information 320, and the delivery information 340.

The emergency plan is to make the autonomous driving vehicle 1 travel along the evacuation route RE. The vehicle travel control device 200 proposes the emergency plan to the user. When the user approves the emergency plan, the vehicle travel control device 200 aborts the planned travel route RA and makes the autonomous driving vehicle 1 travel along the evacuation route RE.

If the autonomous driving vehicle 1 is unable to evacuate from the second alarming phenomenon within a certain period of time, the vehicle travel control device 200 may carry out another emergency plan. For example, the vehicle travel control device 200 makes the autonomous driving vehicle 1 stop at a safe location around the current location. The safe stop location is determined based on the map information 320 and the surrounding situation information 332. Whether the autonomous driving vehicle 1 is stopped is confirmed based on the vehicle state information 331 (the vehicle speed).

After the autonomous driving vehicle 1 stops, the vehicle travel control device 200 controls the door lock device 70 to unlock the door. That is, even if the autonomous driving vehicle 1 has not yet arrived at the destination DST, the vehicle travel control device 200 unlocks the door. Before or after unlocking the door, the vehicle travel control device 200 uses the output device of the HMI unit 60 to notify the user of the unlocking. The user takes an appropriate action depending on a situation in accordance with the user's own judgment.

4-3. Third Example

As a third example, let us consider a case where the alarming phenomenon is earthquake.

Step S20: Alarming Phenomenon Recognition Processing

The delivery information 340 (specifically, the alarming phenomenon information) indicates the seismic intensity of the earthquake for each area. The vehicle travel control device 200 can recognize the earthquake based on the delivery information 340.

Step S30: Determination Processing

When the seismic intensity at the current location is weak, it is considered that there is no need to halt the vehicle travel control in accordance with the current travel plan. Therefore, the vehicle travel control device 200 checks the seismic intensity at the current location based on the position-orientation information 310 and the delivery information 340. When the seismic intensity at the current location is equal to or higher than a certain level (e.g. seismic intensity of 5), the vehicle travel control device 200 determines to halt the vehicle travel control in accordance with the current travel plan.

Step S40: Emergency Control Processing

Figure 6:
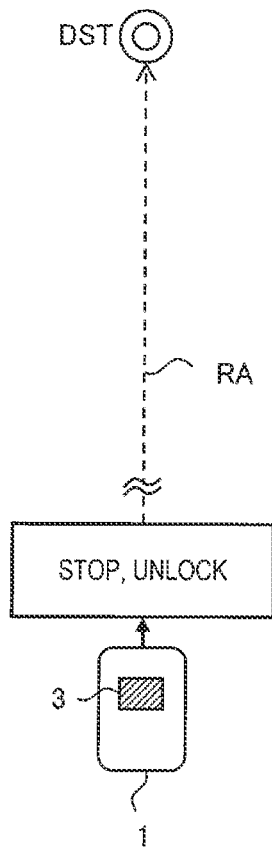
FIG. 6 is a conceptual diagram for explaining still another example of the emergency plan in the embodiment of the present disclosure.

As shown in FIG. 6, the emergency plan is to make the autonomous driving vehicle 1 stop and unlock the door, regardless of the destination DST. More specifically, the vehicle travel control device 200 makes the autonomous driving vehicle 1 stop at a safe location around the current location. The safe stop location is determined based on the map information 320 and the surrounding situation information 332. Whether the autonomous driving vehicle 1 is stopped is confirmed based on the vehicle state information 331 (the vehicle speed).

When making the autonomous driving vehicle 1 stop, the vehicle travel control device 200 may determine whether or not the current location is in a town. Whether or not the current location is in a town can be determined based on the map information 320 or a concentration of surrounding buildings. The concentration of surrounding buildings can be obtained from the surrounding situation information 332. When the current location is in a town, the vehicle travel control device 200 immediately makes the autonomous driving vehicle 1 stop. On the other hand, when the current location is not in a town, the vehicle travel control device 200 notifies the user of occurrence of the earthquake to alert the user. After that, the vehicle travel control device 200 makes the autonomous driving vehicle 1 stop.

After the autonomous driving vehicle 1 stops, the vehicle travel control device 200 controls the door lock device 70 to unlock the door. That is, even if the autonomous driving vehicle 1 has not yet arrived at the destination DST, the vehicle travel control device 200 unlocks the door. Before or after unlocking the door, the vehicle travel control device 200 uses the output device of the HMI unit 60 to notify the user of the unlocking. The user takes an appropriate action depending on a situation in accordance with the user's own judgment. The vehicle travel control device 200 may use the output device of the HMI unit 60 to suggest an evacuation route to the user.

4-4. Fourth Example

As a fourth example, let us consider a case where the alarming phenomenon is tsunami.

Step S20: Alarming Phenomenon Recognition Processing

The delivery information 340 (specifically, the alarming phenomenon information) indicates an advisory, a warning, and an expected area of the tsunami. The vehicle travel control device 200 can recognize occurrence of the tsunami based on the delivery information 340.

Step S30: Determination Processing

When influence of the tsunami does not extend to the current location and the planned travel route RA, it is considered that there is no need to halt the vehicle travel control in accordance with the current travel plan. Therefore, the vehicle travel control device 200 determines, based on the position-orientation information 310 and the delivery information 340, whether or not the expected area of the tsunami covers the current location or the planned travel route RA. When the expected area of the tsunami covers the current location or the planned travel route RA, the vehicle travel control device 200 determines to halt the vehicle travel control in accordance with the current travel plan.

Step S40: Emergency Control Processing

As shown in FIG. 6, the emergency plan is to make the autonomous driving vehicle 1 stop and unlock the door, regardless of the destination DST. More specifically, the vehicle travel control device 200 makes the autonomous driving vehicle 1 stop at a safe location around the current location. The safe stop location is determined based on the map information 320 and the surrounding situation information 332. Whether the autonomous driving vehicle 1 is stopped is confirmed based on the vehicle state information 331 (the vehicle speed).

After the autonomous driving vehicle 1 stops, the vehicle travel control device 200 controls the door lock device 70 to unlock the door. That is, even if the autonomous driving vehicle 1 has not yet arrived at the destination DST, the vehicle travel control device 200 unlocks the door. Before or after unlocking the door, the vehicle travel control device 200 uses the output device of the HMI unit 60 to notify the user of the unlocking. The user takes an appropriate action depending on a situation in accordance with the user's own judgment. The vehicle travel control device 200 may use the output device of the HMI unit 60 to suggest an evacuation route to the user.

5. Summary

According to the present embodiment, as described above, when the alarming phenomenon occurs at the current location or on the planned travel route RA, the autonomous driving vehicle 1 determines whether to continue or halt the vehicle travel control in accordance with the current travel plan. When determining to halt the vehicle travel control in accordance with the current travel plan, the autonomous driving vehicle 1 aborts the current travel plan and performs the vehicle travel control in accordance with the emergency plan. The emergency plan is appropriately set depending on the type of the alarming phenomenon. As a result, the safety of the user on board the autonomous driving vehicle 1 improves. This contributes to increase in confidence in the driverless transportation service.

What is claimed is:

1. An autonomous driving vehicle that provides a driverless transportation service for a user, the autonomous driving vehicle comprising:
    a processor programmed to:
    control travel of the autonomous driving vehicle;
    recognize a phenomenon at a current location of the autonomous driving vehicle or on a planned travel route from the current location to a destination, the phenomenon being one or more of rain, snow, a flood, an earthquake, or a tsunami;
    based on recognizing the phenomenon, determine whether to continue or halt vehicle travel control in accordance with a current travel plan; and
    based on determining to halt the vehicle travel control in accordance with the current travel plan, select an emergency plan and control the autonomous driving vehicle in accordance with the selected emergency plan, wherein:
    a first emergency plan controls the autonomous driving vehicle to travel along a bypass route that bypasses the phenomenon to reach the destination,
    a second emergency plan controls the autonomous driving vehicle to travel along an evacuation route that enables evacuation from the phenomenon,
    a third emergency plan controls the autonomous driving vehicle to stop at the current location regardless of the destination and unlocks a door of the autonomous driving vehicle after the autonomous driving vehicle stops,
    the processor is further programmed to select one of the first emergency plan, the second emergency plan, or the third emergency plan as the emergency plan according to whether the recognized phenomenon is the rain, the snow, the flood, the earthquake, or the tsunami, and
    the third emergency plan further includes:
    obtaining concentration of surrounding buildings from surrounding situation information indicating a situation around the autonomous driving vehicle and obtained by a sensor group of the autonomous driving vehicle;
    determining whether the current location of the autonomous driving vehicle is in a town based on whether the concentration of surrounding buildings is higher than a threshold;
    when the current location is in a town, controlling the autonomous driving vehicle to stop at the current location without notifying the user of occurrence of the phenomenon; and
    when the current location is not in a town, controlling the autonomous driving vehicle to stop at the current location after notifying the user of occurrence of the phenomenon.

2. The autonomous driving vehicle according to claim 1, wherein
    based on the phenomenon being any of the rain, the snow, the flood, the earthquake, or the tsunami on the planned travel route, the processor is further programmed to select the first emergency plan as the emergency plan.

3. The autonomous driving vehicle according to claim 1, wherein
    based on the phenomenon being any of the rain, the snow, the flood, the earthquake, or the tsunami at the current location, the processor is further programmed to select the second emergency plan as the emergency plan.

4. The autonomous driving vehicle according to claim 1, wherein
    based on the phenomenon being any of an earthquake or a tsunami, the processor further programmed to select the third emergency plan as the emergency plan.

5. The autonomous driving vehicle according to claim 1, further comprising a memory storing driving environment information indicating a driving environment of the autonomous driving vehicle, wherein
    the processor is further programmed to recognize the phenomenon based on the driving environment information.

6. A method for controlling an autonomous driving vehicle that provides a driverless transportation service for a user, the method comprising:
    recognizing a phenomenon at a current location of the autonomous driving vehicle or on a planned travel route from the current location to a destination, the phenomenon being one or more of rain, snow, a flood, an earthquake, or a tsunami;

based on recognizing the phenomenon, determining whether to continue or halt vehicle travel control in accordance with a current travel plan; and based on determining to halt the vehicle travel control in accordance with the current travel plan, selecting an emergency plan and controlling the autonomous driving vehicle in accordance with the selected emergency plan, wherein a first emergency plan controls the autonomous driving vehicle to travel along a bypass route that bypasses the phenomenon to reach the destination, a second emergency plan controls the autonomous driving vehicle to travel along an evacuation route that enables evacuation from the phenomenon, a third emergency plan controls the autonomous driving vehicle to stop at the current location regardless of the destination and unlocks a door of the autonomous driving vehicle after the autonomous driving vehicle stops, selecting the emergency plan comprises selecting one of the first emergency plan, the second emergency plan, or the third emergency plan as the emergency plan according to whether the recognized phenomenon is the rain, the snow, the flood, the earthquake, or the tsunami, and the third emergency plan further includes:

obtaining concentration of surrounding buildings from surrounding situation information indicating a situation around the autonomous driving vehicle and obtained by a sensor group of the autonomous driving vehicle;

determining whether the current location of the autonomous driving vehicle is in a town based on whether the concentration of surrounding buildings is higher than a threshold;

when the current location is in a town, controlling the autonomous driving vehicle to stop at the current location without notifying the user of occurrence of the phenomenon; and when the current location is not in a town, controlling the autonomous driving vehicle to stop at the current location after notifying the user of occurrence of the phenomenon.

7. A non-transitory computer readable recording medium storing a program that causes a computer to execute:

recognizing a phenomenon at a current location of an autonomous driving vehicle or on a planned travel route from the current location to a destination, the phenomenon being one or more of rain, snow, a flood, an earthquake, or a tsunami;

based on recognizing the phenomenon, determining whether to continue or halt vehicle travel control in accordance with a current travel plan; and based on determining to halt the vehicle travel control in accordance with the current travel plan, selecting an emergency plan and controlling the autonomous driving vehicle in accordance with the selected emergency plan, wherein a first emergency plan controls the autonomous driving vehicle to travel along a bypass route that bypasses the phenomenon to reach the destination, a second emergency plan controls the autonomous driving vehicle to travel along an evacuation route that enables evacuation from the phenomenon, a third emergency plan controls the autonomous driving vehicle to stop at the current location regardless of the destination and unlocks a door of the autonomous driving vehicle after the autonomous driving vehicle stops, selecting the emergency plan comprise selecting one of the first emergency plan, the second emergency plan, or the third emergency plan as the emergency plan according to whether the recognized phenomenon is the rain, the snow, the flood, the earthquake, or the tsunami, and the third emergency plan further includes:

obtaining concentration of surrounding buildings from surrounding situation information indicating a situation around the autonomous driving vehicle and obtained by a sensor group of the autonomous driving vehicle;

determining whether the current location of the autonomous driving vehicle is in a town based on whether the concentration of surrounding buildings is higher than a threshold;

when the current location is in a town, controlling the autonomous driving vehicle to stop at the current location without notifying the user of occurrence of the phenomenon; and when the current location is not in a town, controlling the autonomous driving vehicle to stop at the current location after notifying the user of occurrence of the phenomenon.

* * * * *